(12) United States Patent
Inoue

(10) Patent No.: US 6,935,631 B2
(45) Date of Patent: Aug. 30, 2005

(54) SHEET BRUSH SEAL

(75) Inventor: Hideyuki Inoue, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 276 days.

(21) Appl. No.: 10/443,862

(22) Filed: May 23, 2003

(65) Prior Publication Data

US 2005/0046113 A1 Mar. 3, 2005

(30) Foreign Application Priority Data

May 23, 2002 (JP) ........................................ 2002-149026

(51) Int. Cl.[7] .............................................. F16J 15/44
(52) U.S. Cl. ....................................................... 277/355
(58) Field of Search ................................. 277/355, 543

(56) References Cited

U.S. PATENT DOCUMENTS

| | | | | |
|---|---|---|---|---|
| 4,399,999 A | * | 8/1983 | Wold | 277/546 |
| 4,433,848 A | * | 2/1984 | Williams | 277/547 |
| 4,811,961 A | * | 3/1989 | Williams | 277/545 |
| 5,031,922 A | * | 7/1991 | Heydrich | 277/355 |
| 5,071,138 A | * | 12/1991 | Mackay et al. | 277/303 |
| 5,755,445 A | * | 5/1998 | Arora | 277/418 |
| 5,941,685 A | * | 8/1999 | Bagepalli et al. | 415/173.3 |
| 6,267,381 B1 | * | 7/2001 | Wright | 277/355 |
| 6,585,271 B2 | * | 7/2003 | Divan | 277/543 |

* cited by examiner

*Primary Examiner*—Alison K. Pickard
(74) *Attorney, Agent, or Firm*—Arent Fox PLLC

(57) ABSTRACT

A primary technical goal of the present invention is to improve seal performance of a brush seal and to provide flexibility for preventing wear of the brush seal due to friction. The sheet brush seal disk comprises a first halved brush seal disk and a mating second halved brush seal disk wherein a pair of the first base portion of the first halved brush seal disk and the second base portion of the second halved brush seal disk are stacked with each other. In the brush portion of the sheet brush seal disk, the convex first brush portion and the concave first slit portion disposed in the first halved brush seal disk engage the convex second brush portion and the concave second slit portion disposed in the second halved brush seal disk, respectively.

7 Claims, 18 Drawing Sheets

Prior Art

Prior Art

Prior Art

Prior Art

SHEET BRUSH SEAL

BACKGROUND OF THE INVENTION

1. Field of the Invention

The present invention relates generally to a sheet brush seal providing a seal between a shaft and a relatively moving element. More particularly, the invention relates to a sheet brush seal used in airplanes, gas turbines or the like which provides a seal between a rotor shaft and a casing (opposing element) which moves relative to the rotor shaft due to a shaft vibration.

2. Description of the Related Art

There has been a brush seal device 100A as a relative art of the present invention as shown in FIG.15.

FIG.15 shows a cross sectional view of the brush seal device 100A which is disposed between a rotor shaft 120 and a casing 110 through which the rotor shaft 120 extends.

The casing 110 is an element which is securely fixed in a steam turbine or a gas turbine. The brush seal device 100A is installed in the casing 110 providing a seal of a process fluid over the rotary shaft 120.

The brush seal device 100A in FIG. 15 has a ring shape and its outer circumference portion which is defined as a mounting portion 104 is disposed in the fixture groove portion 112 of the casing 110. The brush seal device 100A is mainly comprised of a brush seal 109, a backing plate 112 and a support plate 103. Thickness of the brush seal 109 is determined by a plurality of strong brush bristles piled along the axial direction. This defines a ring shaped circular wall of the equal thickness. The outer circumferential end portion of a ring shape being integrated defines the mounting portion 104.

Also a free end face 105 of the brush seal 109 is disposed in an opposing manner relative to the rotor shaft 120. Diameter of the strong brush bristle 101 is generally chosen in a range from 0.02 mm to 0.5 mm, and the number of the brush bristles ranges from several ten thousands to hundred thousands.

The opposite face of the brush seal 109 relative to the process fluid is located in such a way that the face is kept in contact with a side face 108 of the backing plate 102 which has a donut shape, and the backing plate 102 gives a support to the brush seal 109 such that the brush bristles do not give way to the pressure exerted by the process fluid.

The backing plate 102 and a retaining plate 103 which is a circular ring shape securely clamp therebetween the mounting portion 104 of the brush seal 109. The width of the retaining plate 103 in a radial direction is arranged to be small so that the retaining plate 103 does not restrain the free end portion of the brush seal 109. As a result, the front face of the brush seal 109 is exposed to the process fluid side.

The backing plate 102, the mounting portion 104 of the brush seal 109 and the retaining plate 103 are welded together at their common ends to form an integral joint portion 106.

The straight brush bristles 101 shown in FIG. 15 are disposed along radial directions with respect to the diameter of the rotor shaft 120. The brush seal 109 under normal circumstances is in contact or nearly in contact with the rotor shaft 120 at its free end face 105.

As described above, the brush seal 109 retains a pack of brush bristles 101 being assembled along the circumferential direction to form a ring structure. And the free end face 105 of the brush seal 109 is subjected to a precision finish such as a wire EDM so that the end face 105 precisely fits the rotor shaft 120. The brush bristles 101, however, easily give way and it is extremely difficult to prepare the brush bristles 101 to such an extent that a tiny clearance is formed between the end face 105 and the rotor shaft 120.

In the brush seal device 100A constructed as mentioned above, the brush seal 109 is pressed against the rotor shaft 120 when a vibration or a swinging motion of the rotor shaft causes it to touch the brush seal 109.

Under this circumstance with a high process fluid pressure P1 in FIG. 15, an increased pressure differential P1–P2 relative to a lower pressure P2 induces the straight brush bristles 101 of the brush seal 109 to be forced to press against the backing plate throughout the entire portion of the bristles and a resulted decrease in the flexibility of the bristles leads to a deterioration of the traceablity of the bristles relative to the rotor shaft 120. Therefore, such a forced contact causes the wear of both the rotor shaft 120 and the brush bristles 101.

FIG. 16 illustrates the front view of the inner diameter free end face 105 of the brush seal 109 given in FIG. 15.

When the process fluid enters between the brush bristles 101 in FIG. 15 and FIG. 16, the individual brush bristles 101 arranged as shown in FIG. 16 when viewed from the inner circumferential side are forced to move aside so that gaps are created between the adjacent brush bristles 101. These gaps cause a leakage of the process fluid. Furthermore, the brush bristles 101 once being pushed aside while being pressed against the backing plate 102 due to the process fluid pressure cannot easily restore the original position. Therefore the seal performance is decreased.

Under this circumstance, when a portion of the brush seal 109 is assumed to mate with the rotor shaft 120 in a press fitting manner, the opposite side relative to the portion develops a wide clearance C between the rotor shaft 120 and the free end face 105 of the brush bristles 101. This clearance C causes a leakage of the process fluid from between the brush seal 109 and the rotor shaft 120.

There has been a brush seal device 100B as a relative art of the present invention, as shown in FIG. 18. The seal device 100B of FIG. 18 provides a seal between the higher pressure region P1 and the lower pressure region P2 by means of a plurality of thin layered sheet seal 209 which are laminated along the circumferential direction of the rotor shaft 120.

The outer circumferential portion of the sheet seal 209 is brazed to form a mounting portion 104 by means of which the sheet seal 209 is disposed in the installation groove portion of the casing 110. A backing plate 102 is disposed adjacent the side face of the sheet seal 209 in the lower pressure region P2 while a retaining plate 103 is disposed adjacent the opposite side face in the higher pressure region P1. These two plates 102, 103 provide a support for the sheet seal 209 at its both sides.

However, with a sheet seal 209 thus arranged in which the thin plates are pressed against the decentered rotor shaft 120, the sheet seal 209 forcibly arched cannot easily undertake an elastic deformation and it results in a large spring coefficient corresponding to the elastic deformation. Therefore this leads to a problem of difficulty in following the eccentricity of the rotor shaft 120. In order to avoid this problem, a modest clearance between the free end face of the sheet seal 209 and the outer diameter surface of the rotor 120 is assumed. This clearance in turn deteriorates the seal performance of the device due to a leakage of the process fluid through it.

In the sheet seal 209, a plurality of simple flat plates are laminated in parallel to the direction of the action of the process fluid pressure. Therefore, the process fluid pressure acting in that direction easily leaks through a lamination gap between the individual flat plates and this ends up with a sealing problem against the process fluid.

In addition, the poor flexible nature of the lamination structure results in a fast wear of the free end face 105 of the sheet seal 209.

The present invention is introduced to resolve the above mentioned problems. A primary technical goal which this invention tries to achieve is to improve the seal performance of a brush seal.

Another goal is to enhance the elastic deformation capability of a brush seal against a pressing force given by a rotor shaft and to decrease a wear of the brush seal caused by the rotor shaft.

Yet another goal is to achieve a good traceability of a brush seal relative to a rotor shaft when the rotor shaft rotates while being in contact with the brush seal and to prevent an energy loss for driving the rotor shaft under such a contact state. A further goal is to prevent a decrease of a seal performance of the brush seal due to fluctuations of the rotor shaft.

SUMMARY OF THE INVENTION

A primary object of the present invention is to resolve the above mentioned technical problems, and a solution to such problems is embodied as follows.

The first embodiment of a sheet brush seal constructed in accordance with the principles of the present invention is a sheet brush seal for providing a seal between two relatively moving parts with a presence of a clearance by being disposed in one of the two parts and sealing relative to the other part. The sheet brush seal is equipped with a sheet brush seal disk which retains a sheet brush portion where narrow beams are disposed in a row toward the latter part and a stacking base portion being installed in the former part. The sheet brush seal disk comprises a pair of a first halved brush seal disk and a second halved brush seal disk wherein a first base portion of the first halved brush seal disk and a second base portion of the second halved brush seal disk are laminated with each other. The sheet brush portion is formed by mating the brush portions protruding beyond a side surface of the first halved brush seal disk with the slit portions of the second halved brush seal disk as well as mating the slit portions of the first halved brush seal disk with the brush portions protruding beyond a side surface of the second halved brush seal disk. The brush portions and the slit portions of the second halved brush seal disk as well as those of the first halved brush seal disk are disposed in an alternate manner, respectively.

In the first embodiment of a sheet brush seal constructed in accordance with the principles of the present invention, since the sheet brush seal disk is comprised of a pair of the first halved brush seal disk and the second halved brush seal disk wherein engagement of those halved brush seal disk takes place as a result of fitting of the brush portions with the slit portions of the halved brush seal disks, a resulting fit clearance is very small and the seal performance is significantly improved. Also when a plurality of the sheet brush seal disks are stacked up, shifting the mating surface of a brush portion and a slit portion of one disk relative to the mating surfaces of adjacent disks such that the fit clearances of the adjacent disks are not aligned in the stacking direction, by which the sheet brush seal further improves its seal performance. Furthermore, since the brush portion is comprised of a plurality of narrow beams being arranged in a row along a direction of action of a process fluid pressure, it exhibits flexibility against a contact with an opposing element. Also it effectively prevents wear by reducing a friction due to a contact with the opposing element.

In addition, assembly of the individual sheet brush seal disks is significantly simplified.

DETAILED DESCRIPTION OF THE INVENTION

Described below is details of the figures of a preferred embodiment of a sheet brush seal constructed in accordance with the principles of the present invention.

Figure 1:
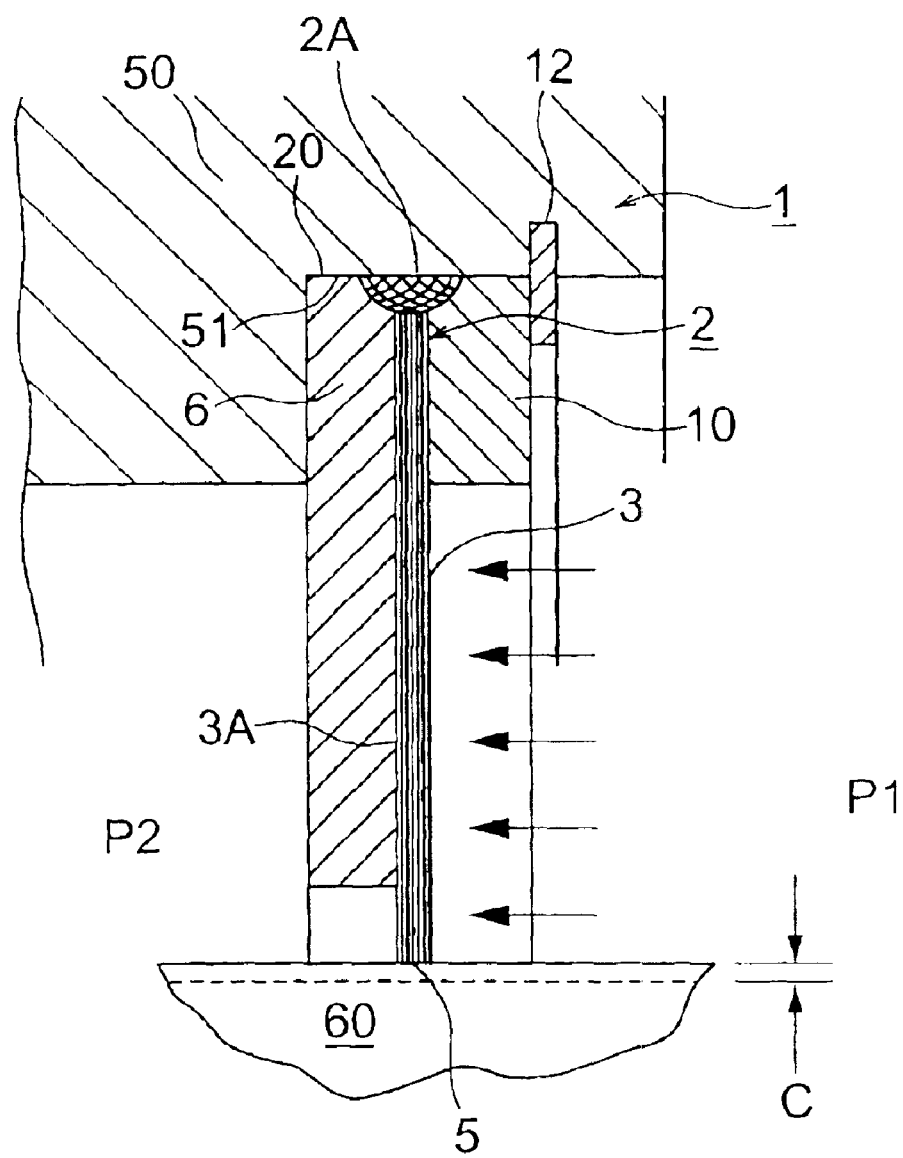
FIG. 1 is a half cut-away sectional view of a sheet brush seal device as a first embodiment related to the present invention.
Figure 2:
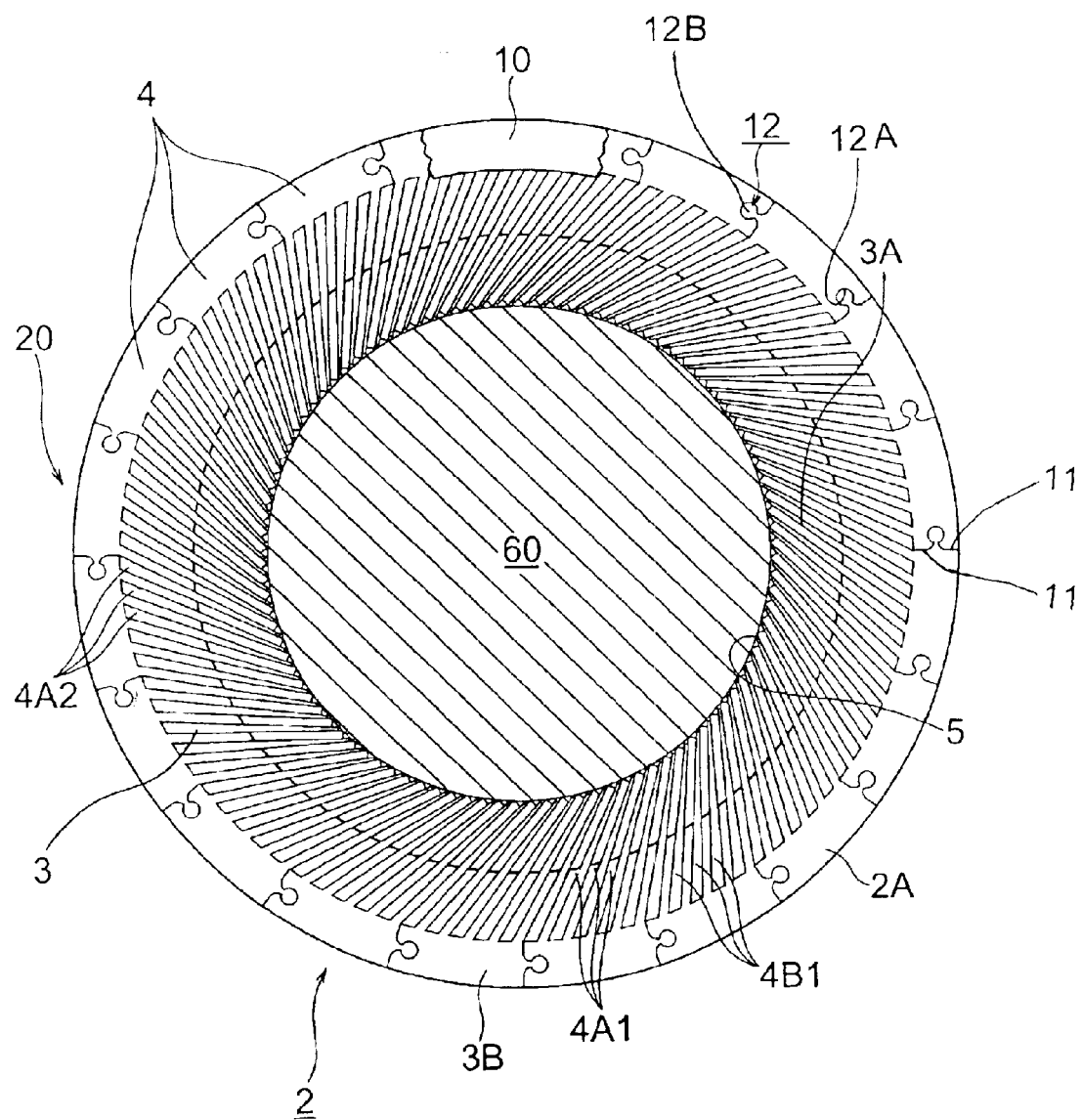
FIG. 2 is a front view of a sheet brush seal of FIG. 1 when viewed from its axial front.
Figure 3:
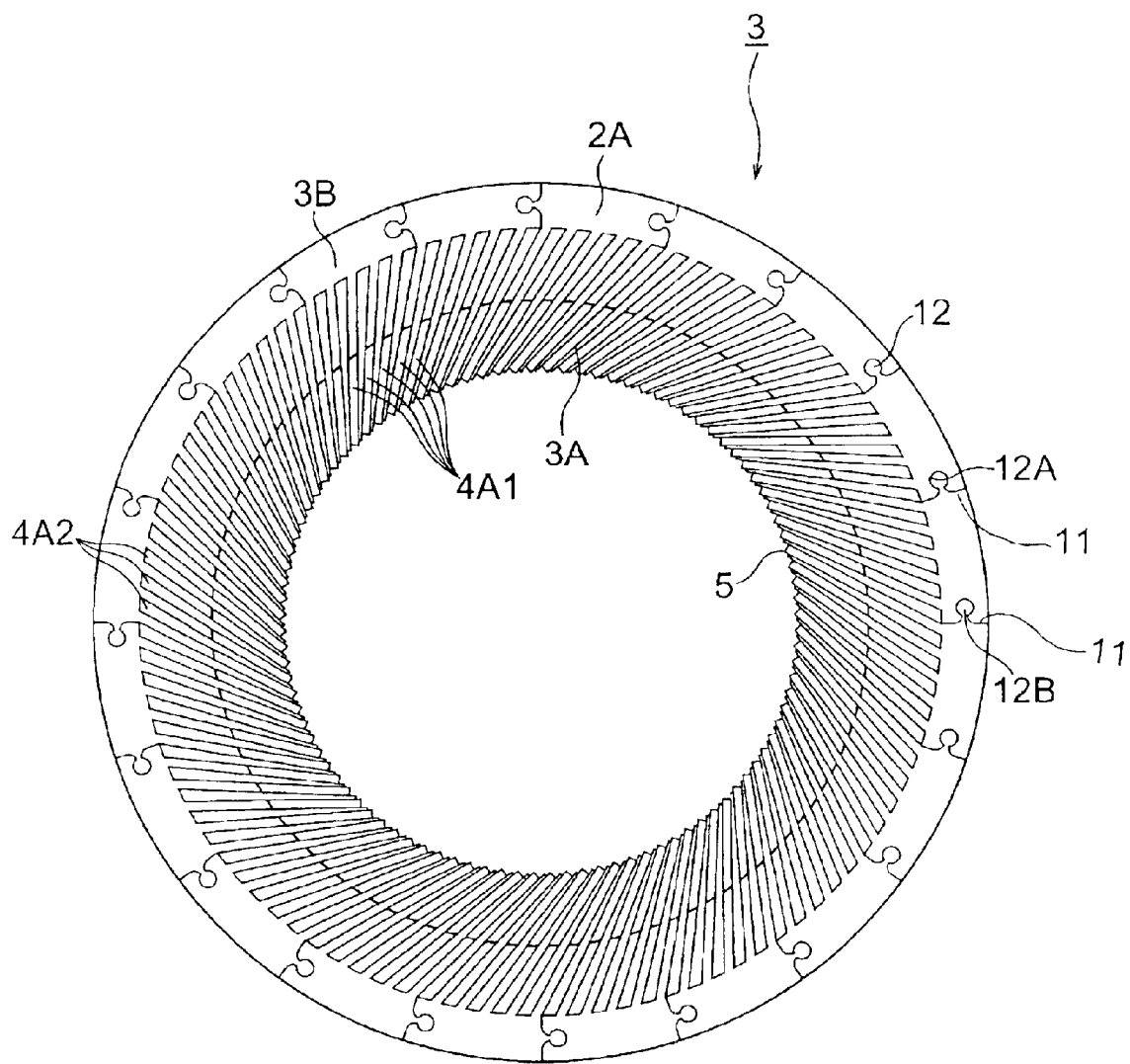
FIG. 3 is a top view of a single disk of the sheet brush seal shown in FIG. 1.
Figure 4:
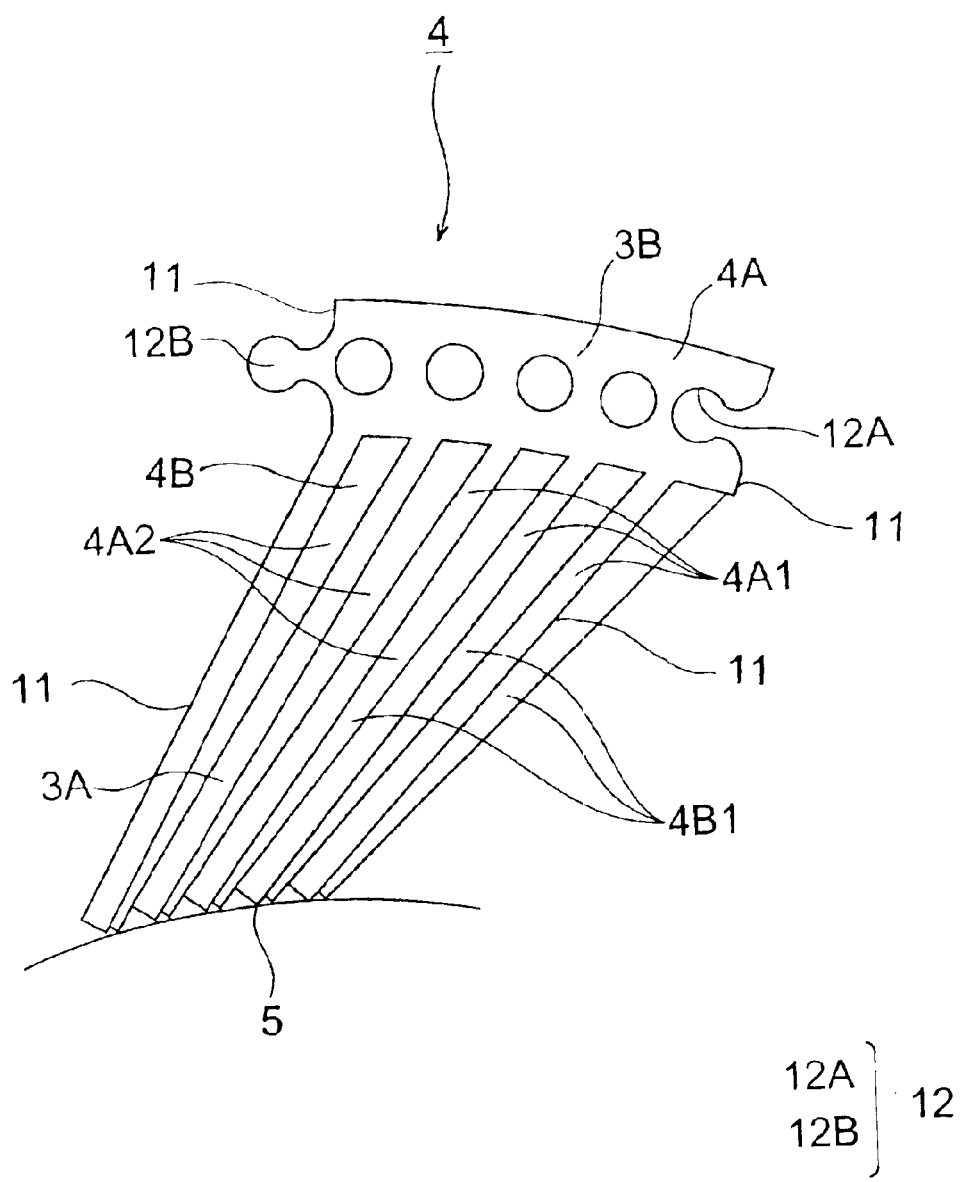
FIG. 4 is a top view of a segment of the sheet brush seal shown in FIG. 3 as the first example.

FIG. 1 shows a half cut-away sectional view of a sheet brush seal device 1 which provides a seal between a higher pressure region P1 and a lower pressure region P2 at a clearance located between a casing 50 of a gas turbine and a rotor 60 which extends through the casing 50. FIG. 2 is a top view of a sheet brush seal 2 shown in FIG. 1. FIG. 3 is a top view of a single brush seal disk 3 which constitutes a sheet brush seal 2 of FIG. 2. FIG. 4 is a sheet brush seal segment 4 which is obtained by dividing the single brush seal disk 3 of FIG. 3 in an equally spaced manner. Detailed explanations will be given below according to these figures.

In FIG. 1, 1 represents a sheet brush seal device. This sheet brush seal device 1 defines a whole structure installing a sheet brush seal 2 as shown in FIG. 1. Fixture portion 20 of the sheet brush seal device 1 is installed via a snap ring 12 in a step shoulder 51 which is located in the inner diameter surface of the casing 50 which is one of the components constituting the device. The fixture portion 20 can also be installed in a slot which is formed by two step shoulders. The free end portion 5 of the sheet brush seal 2 in the inner circumference side is placed in contact with or adjacent the outer diameter surface of a rotor 60 in an opposing manner. And the sheet brush seal 2 provides a seal for a process fluid located in the higher pressure side P1.

In FIG. 2, the sheet brush seal 2 is comprised of either solely the sheet brush seal 2 or the sheet brush seal 2 accompanied with a backing plate 6 and a retaining plate 10. The backing plate 6 and the retaining plate 10 are supplement components for the sheet brush seal 2. Therefore, use of the backing plate 6 and the retaining plate 10 for installing a seal in a gas turbine or the like is a designer's decision matter.

The sheet brush seal 2 generally deploys a plurality of brush seal disks in a laminated structure. In case of a low process fluid pressure, however, only a single brush seal disk 3 is sufficient to seal the process fluid.

The sheet brush seal 2 assures a design thickness by laminating a plurality of brush seal disks 3 of a ring form. And a disk brush portions 3A are disposed on the individual disks where the disk brush portion 3A retains a plurality of thin beams aligned in rows and the inner circumference side of the beams which forms a ring shape are inclined toward a rotary direction of the rotor 60. The inner circumference side of the sheet brush seal 2 is constituted by a laminated structure of the disk brush portion 3A. Also a stacking base portion 3B located in the outer circumference side of the brush seal disk 3 serves as an installation portion 2A of the sheet brush seal 2. The installation portions 2A are welded together to form an integral structure.

Beams disposed on the disk brush portion 3A of the brush seal disk 3 become narrower in their width toward the inner circumference side of a ring thin plate. The narrow beams defined as a first brush portion 4A1 and a second brush portion 4B1 whose cross section is rectangular or square are alternately laid in row without apparent clearance therebetween. Also the lamination base 3B is defined as a laminated body of a first base portion 4A3 and a second base portion 4B3.

The sheet brush seal 2 shown in FIG. 2 retains a ring body comprising a plurality of laminated brush seal disks 3 depicted in FIG. 3. This brush seal disk 3 then comprises a plurality of arcuate sheet brush seal segments 4 as shown in FIG. 4 which are connected together along the outer circumference. This sheet brush seal segment 4 then consists of a pair of a first halved brush seal disk 4A and a second halved brush seal disk 4B. Use of these sheet brush seal segments 4 brings the merit of improving a yield of sheet material.

The sheet brush seal segment 4 of FIG. 4 is formed by laminating together the first halved brush seal disk 4A and the second halved brush seal disk 4B. This first halved brush seal disk 4A has on its inner circumference side the first brush portions 4A1 and the first slit portions 4A2 disposed in an alternate manner.

Its counterpart, the second halved brush seal disk 4B, also retains corresponding second brush portions 4B1 and second slit portions 4B2 disposed in an alternate manner such that the second brush portions 4B1 and the second slit portions 4B2, respectively, mate with the first slit portions 4A2 and the first brush portions 4A1 when the second halved brush seal disk 4B engages the first halved brush seal disk 4A.

Protrusions disposed on the side surfaces of the first brush portions 4A1 and the second brush portions 4B1 are fabricated by finishing the first base portion 4A3 of the first halved brush seal disk 4A and the second base portion 4B3 of the second halved brush seal disk 4B, respectively, thinner than the thickness of the individual base portions 4A3, 4B3. Thickness of these particular base portions 4A3, 4B3 are chosen to be ½ of the corresponding brush portions 4A1, 4B1 although other choices such as ⅔ or ¼ is also valid according to design specifications.

The arcuate inner circumference of the sheet brush seal segment 4 shown in FIG. 4 is fairly small. Therefore, the first slit portion 4A2 of the first halved brush seal disk 4A has a trapezoidal form.

The second brush portion 4B1 of the mating second halved brush seal disk 4B is meant to engage the corresponding first slit portion 4A2 of the first halved brush seal disk 4A on its side surface when the both halved brush seal disks are laminated over each other.

This brush seal disk 3 is comprised of a plurality of sheet brush seal segments 4 which are more or less equally divided in a circumferential direction and each segment mates with adjacent segments at its both end face. Stacking base portion 3B of the sheet brush seal segment 4 has one split face 11 at its one end where a circular concave portion 12A is disposed and another split face 11 at the other side where a protruding circular convex portion 12B is disposed. The concave portion 12A and the convex portion 11B mate with each other and mating the concave portion 12A with the convex portion 12B constitutes one unit of engagement portion 12.

Figure 5:
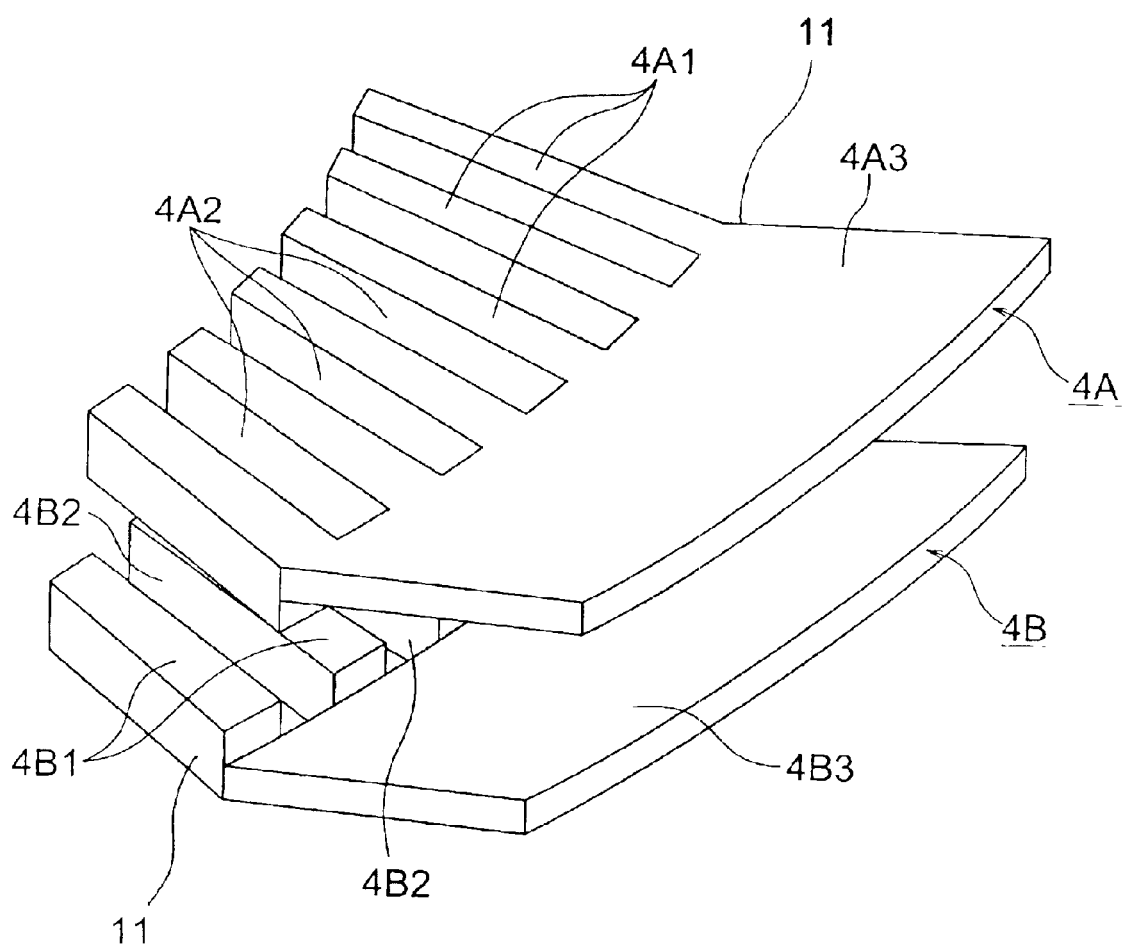
FIG. 5 is an oblique view of a pair of mating halved brush seal disks being under assembly as the second example of the present invention.

FIG. 5 shows a second example of the present invention representing how to fabricate a sheet brush seal segment 4 (FIG. 5 through FIG. 9). In the sheet brush seal segment 4, as shown in FIG. 5, a pair of the first halved brush seal disk 4A and the second halved brush seal disk 4B face with each other at their side faces and the individual first brush portions 4A1 and the second brush portions 4B1 are lined up in one row as a result of the engagement of the first brush portion 4A1 and the second slit portion 4B2 as well as the engagement of the second brush portion 4B1 and the first slit portion 4A2.

Figure 6:
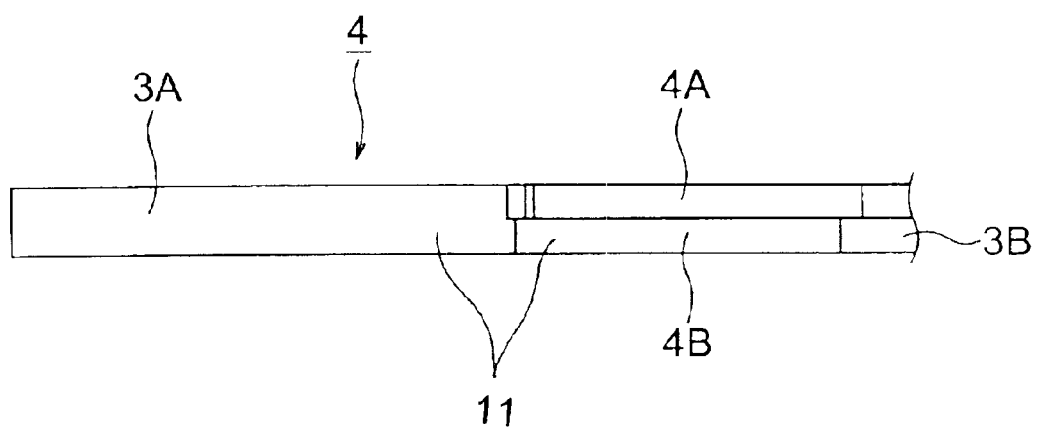
FIG. 6 is a side view of a segment of a sheet brush seal upon a completion of the assembly of a pair of the halved brush seal disks shown in FIG. 5.

FIG. 6 shows the side view of the sheet brush seal segment 4 which assembles a pair of the first and the second halved brush seal disk 4A, 4B of FIG. 5.

Figure 9:
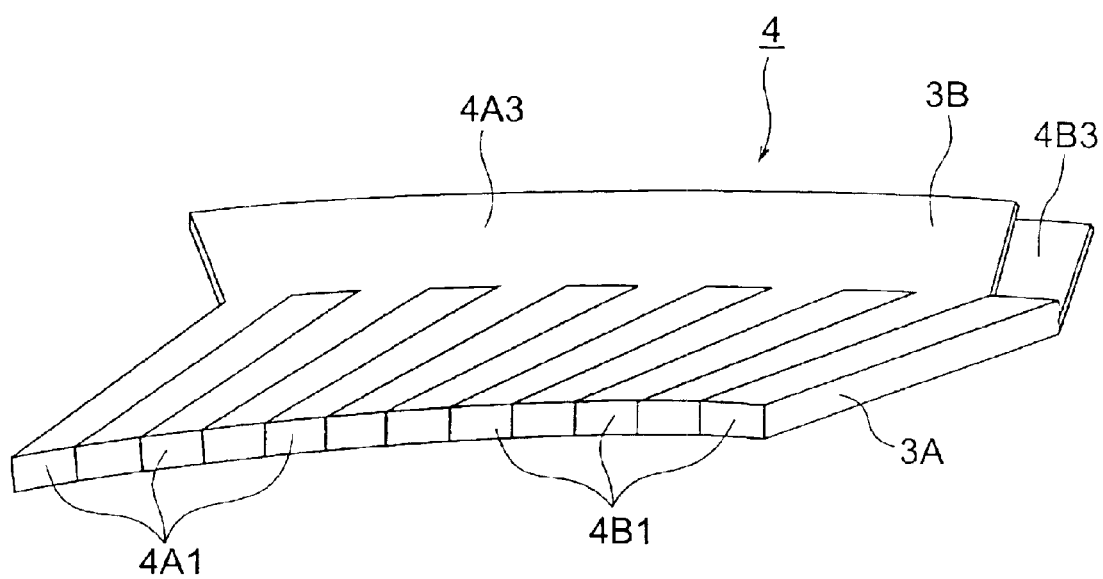
FIG. 9 is an oblique view of the segmented sheet brush seal of FIG. 6.

The sheet brush seal segment 4 is integrated to form a flat plate as shown in FIG. 6. FIG. 9 shows an oblique view of FIG. 6. These individual sheet brush seal segments 4 are joined together at the split faces 11, 11 to constitute a brush seal disk 3 as shown in FIG. 3.

Figure 7:
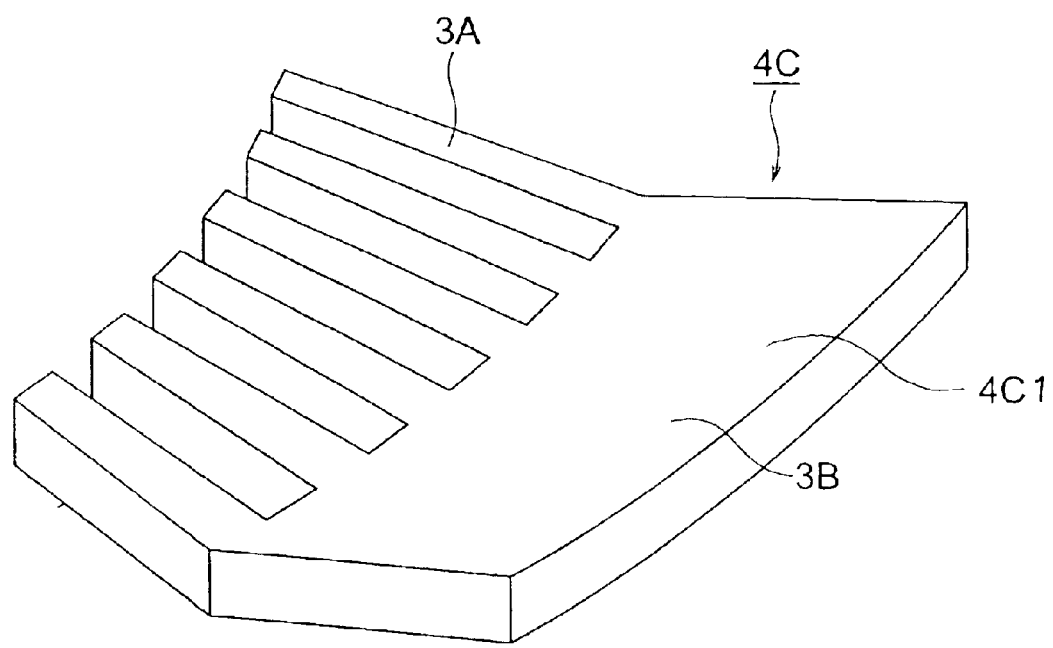
FIG. 7 is an oblique view of a worked module of a halved brush seal disk in FIG. 8 before a completion of the work.

As the first process for fabricating the first halved brush seal disk 4A and the second halved brush seal disk 4B, a cutout module sheet 4C illustrated in FIG. 7 is fabricated by an etching process from a sheet material. At the next process, the thickness of the base portion 4C1 of the cutout module sheet 4C is decreased to a half by a further etching process, which yields a first halved brush seal disk 4A as shown in FIG. 8.

Figure 8:
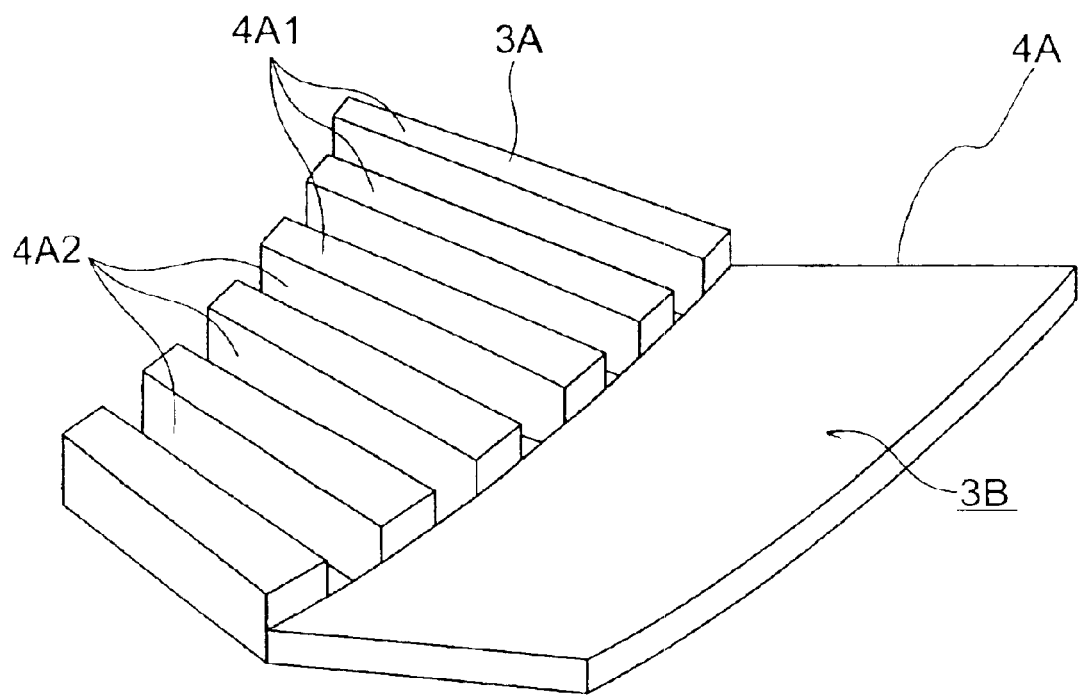
FIG. 8 is an oblique view of a worked module of a halved brush seal disk in FIG. 7 after a completion of the work.

The first halved brush seal disk 4A of FIG. 8 retains in its arcuate inner circumference side a plurality of narrow beam first brush portions 4A1 which are disposed in a row in an intermittent manner, appear approximately trapezoidal when viewed from the top and have a rectangular cross section in which the narrow beams are protruded in a perpendicular direction with respect to the disk surface. Furthermore, the first slit portions 4A2 are disposed in the both sides of the individual first brush portions 4A1 in which the slits have a similar trapezoidal form to that of the brush portions when viewed from the top. And the first brush portions 4A1 and the first slit portions 4A2 provide a sheet brush portion 3A on the first halved brush seal disk 4A.

Likewise, the second halved brush seal disk 4B is fabricated by a similar process as mentioned for the first halved brush seal disk 4A.

In case of a large diameter sheet brush seal 2, it is preferable for a sheet brush seal segment 4 to have the form of the first brush portions 4A1 and the first slit portions 4A2 as shown in FIG. 8. The first brush portions 4A1 and the first slit portions 4A2 of the first halved brush seal disk 4A have an identical form, and the respective first and second brush portions 4A1, 4A2 engage the mating first and second slits 4A2, 4B2 from the side direction by the same width.

Figure 10:
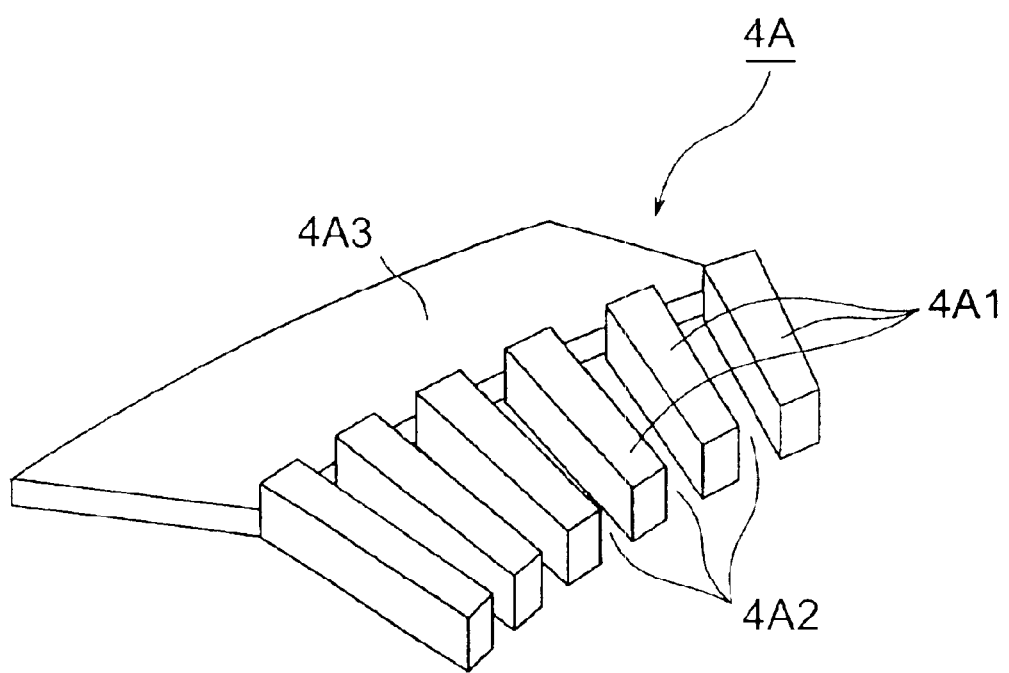
FIG. 10 is an oblique view of a single halved brush seal disk as the third example of the present invention.

A first halved brush seal disk 4A of FIG. 10 represents a third example. This first halved brush seal disk 4A is generally suitable for a smaller inner diameter case. Width of the first slit 4A1 of the first halved brush seal disk 4A preferably is made narrower as it approaches the inner diameter side. Under this circumstance, the width of the second brush portion 2B1 of a second halved brush seal disk 4B which is a mating element of the first halved brush seal disk 4A should be prepared in accordance with the width of the first slit 4A1 of the first halved brush seal disk 4A.

And the second halved brush seal disk 4B to mate with the first halved brush seal disk 4A is fabricated in a similar manner and the both disks are assembled as shown in FIG. 5. Sheet brush seal segments 4 thus assembled are joined with each other at their split faces 11, 11, 11 . . . to construct a sheet brush seal disk 3.

Cross section of the first and the second brush portions 4A1, 4B1 is made rectangular or square. And in a certain example, the dimension of the cross section of the first and the second brush portions 4A1, 4B1 is 0.5–0.005×0.5–0.005 mm, preferably 0.20–0.008×0.20–0.008 mm. Also the first and the second slit portions 4A2, 4B2 engaging the first and the second brush portions 4A1, 4B1 from the side direction have similar dimensions. Their length in this example is in a range of 5–50 mm.

Sheet brush seal segments 4 thus assembled collectively form a ring shape as shown in FIG. 3 by means of the engagement portions 12 in which the concave portions 12A and the convex portions 12B mate with each other at their respective split faces 11, 11.

Figure 13:
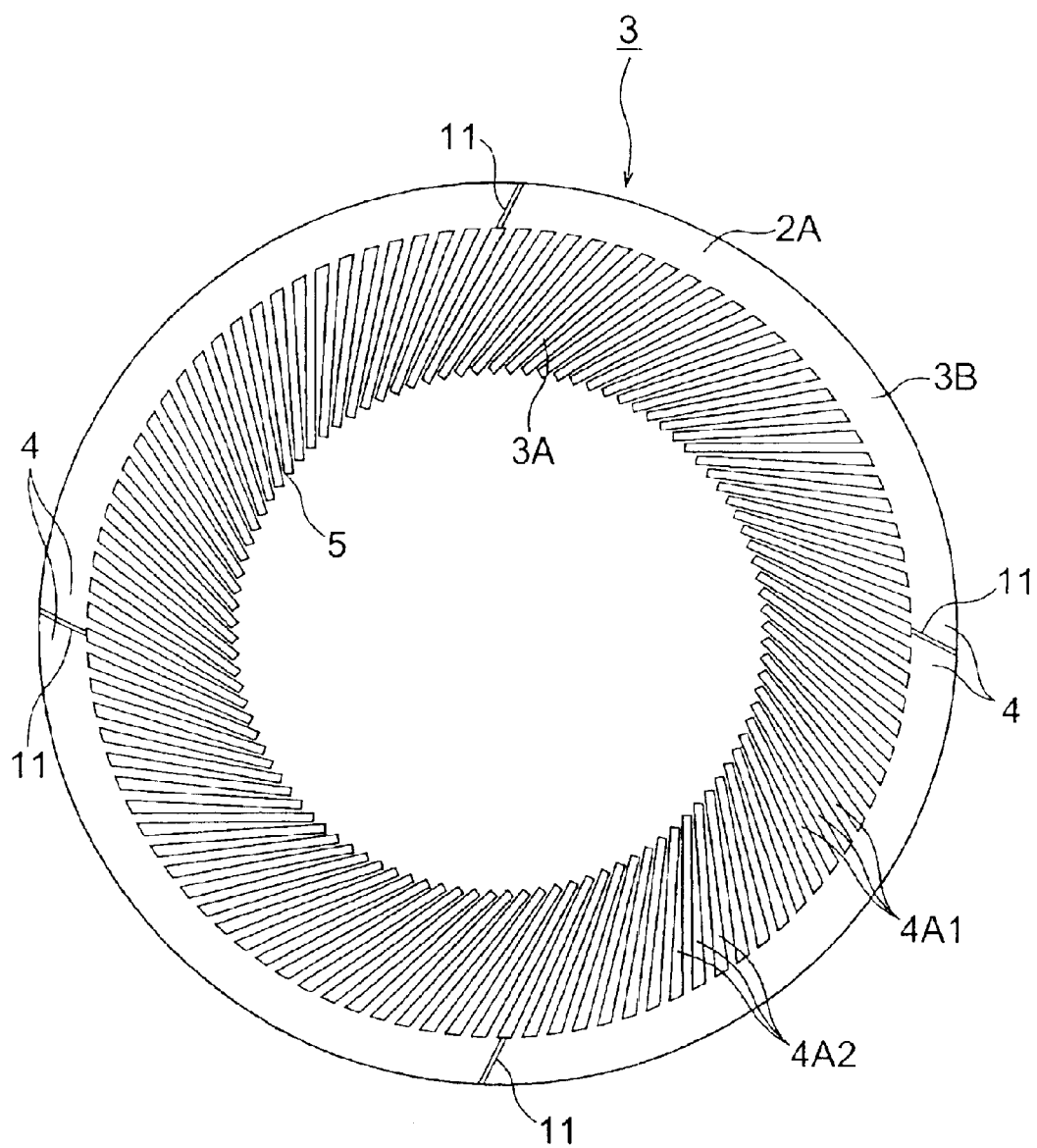
FIG. 13 is a front view of a single disk of the sheet brush seal as the fifth example of the present invention.

Also as shown in FIG. 5 or FIG. 13, it is possible to form such a ring shape by constructing the engagement portion 12 where the split faces 11, 11 are in contact with each other without having concave and convex portions in the split faces 11, 11.

Figure 11:
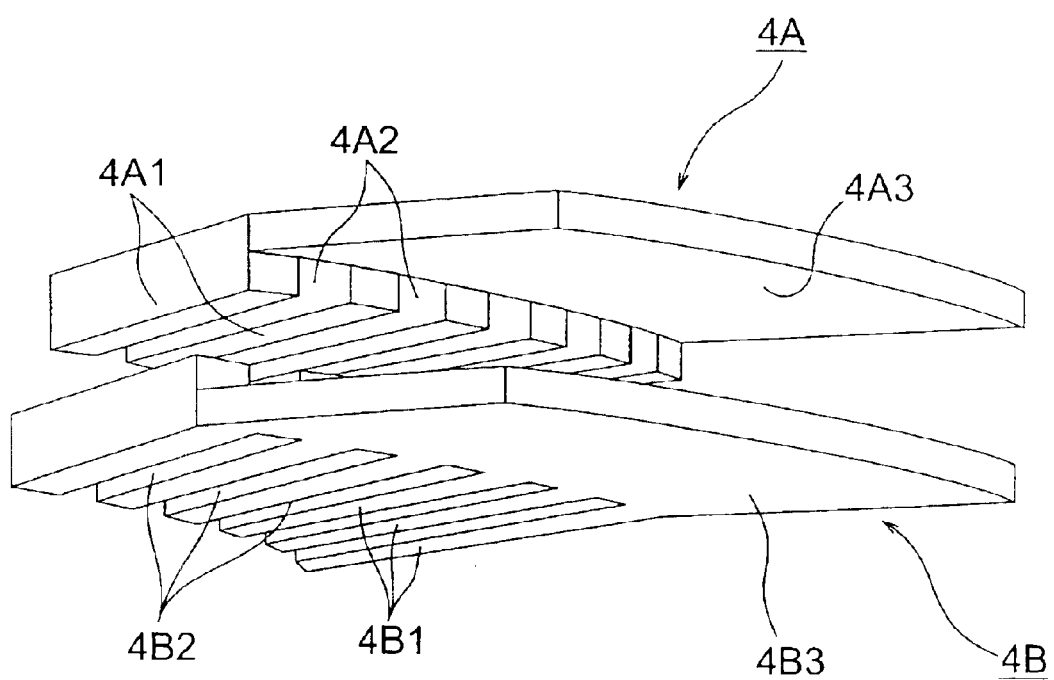
FIG. 11 is an oblique view of the fourth example of the present invention in which a pair of halved brush seal disks are being mated with each other to form a segment of a sheet brush seal.
Figure 12:
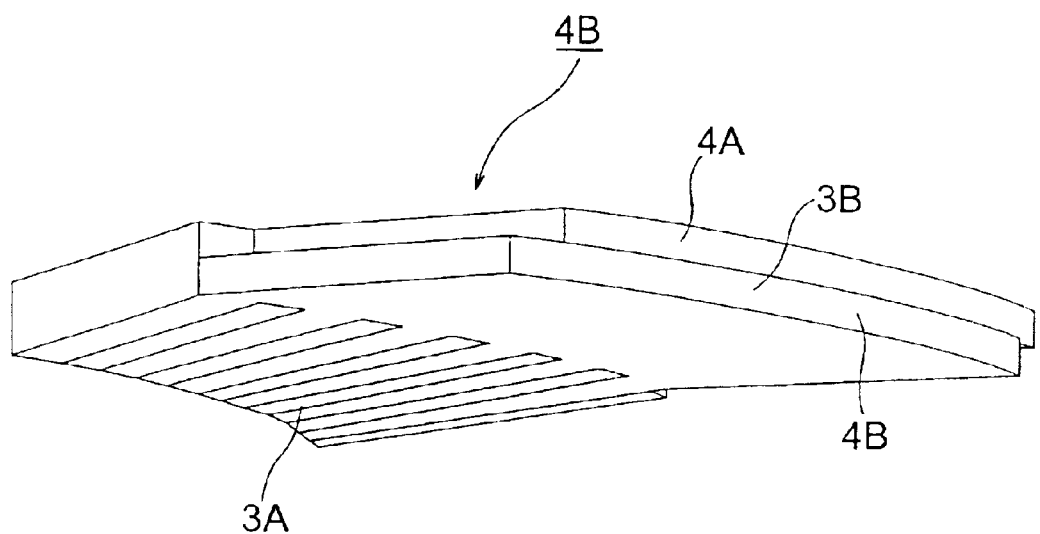
FIG. 12 is an oblique view of a segment of a sheet brush seal which is comprised of a pair of halved brush seal disks in FIG. 11 mating with each other.

FIG. 12 shows an oblique view of the sheet brush seal disk 3 which integrates the first and the second halved brush seal disks 4A, 4B from its side direction as illustrated in FIG. 11. FIGS. 11 and 12 are oblique views of the fourth example of the sheet brush seal segment 4. The first brush portion 4A1 of the first halved brush seal disks 4A is formed by a narrow beam which is a rectangle with a uniform width when viewed from the top. Also the second slit portion 4B2 has a rectangular form with the same dimensions as those of the mating first brush portion 4A1.

FIG. 12 is a sheet brush seal segment 4 with a pair of the first and the second halved brush seal disks 4A, 4B of FIG. 11 where the disks are laid on each other to form an integral structure. The individual first and second brush portions 4A1, 4B1 are disposed in a moveable manner with respect to their mating contact faces or are provided with flexibility by engaging with certain small clearances.

Figure 18:
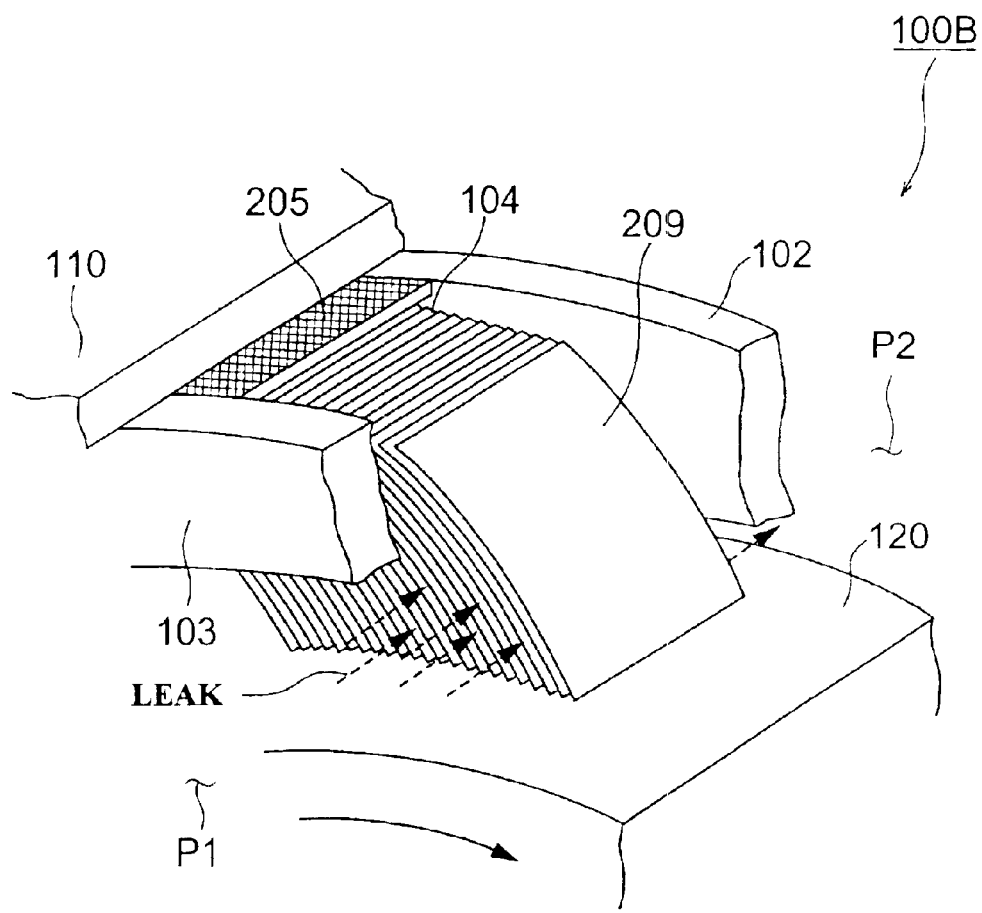
FIG. 18 is an oblique view of a brush seal device as a conventional art.

The sheet brush seal disk 3 of FIG. 12 is suitable for a seal device disposed along the diameter surface of the rotary shaft 120 as shown in FIG. 18. A sheet brush seal device 100B of FIG. 18 related to the present invention utilizes a plurality of rectangular thin sheet seals 209 being laminated around the rotary shaft 120. Therefore, the sheet seals 209 are likely to suffer from wear due to lack of flexibility. However, the sheet brush seal disk 3 shown in FIG. 12 can provide necessary flexibility by virtue of the elastic deformation of the sheet brush portion 3A.

The aforementioned sheet brush seal disks 3 presented in the first through fourth examples have their lamination thickness in a range of 0.5 to 5 mm although their actual thickness should be determined according to a process fluid pressure used.

In addition, the material of the sheet brush seal disk 3 is steel, stainless, nickel based alloy, ceramic and so on.

FIG. 13 shows a sheet brush seal disk 3 which is divided into four pieces along the circumference in an equally spaced manner. The sheet brush seal disk 3 joining the sheet brush seal segments 4 at their split faces 11 defines a fifth example. When a plurality of the sheet brush seal disks 3 are stacked, the individual split faces 11 may be aligned at the same positions along the circumferential direction. Or shifting the positions of the split faces 11 along the circumferential direction further improves a seal performance.

The first brush portion 4A1 and the first slit portion 4A2 have approximately similar forms to those in FIG. 3.

Figure 14:
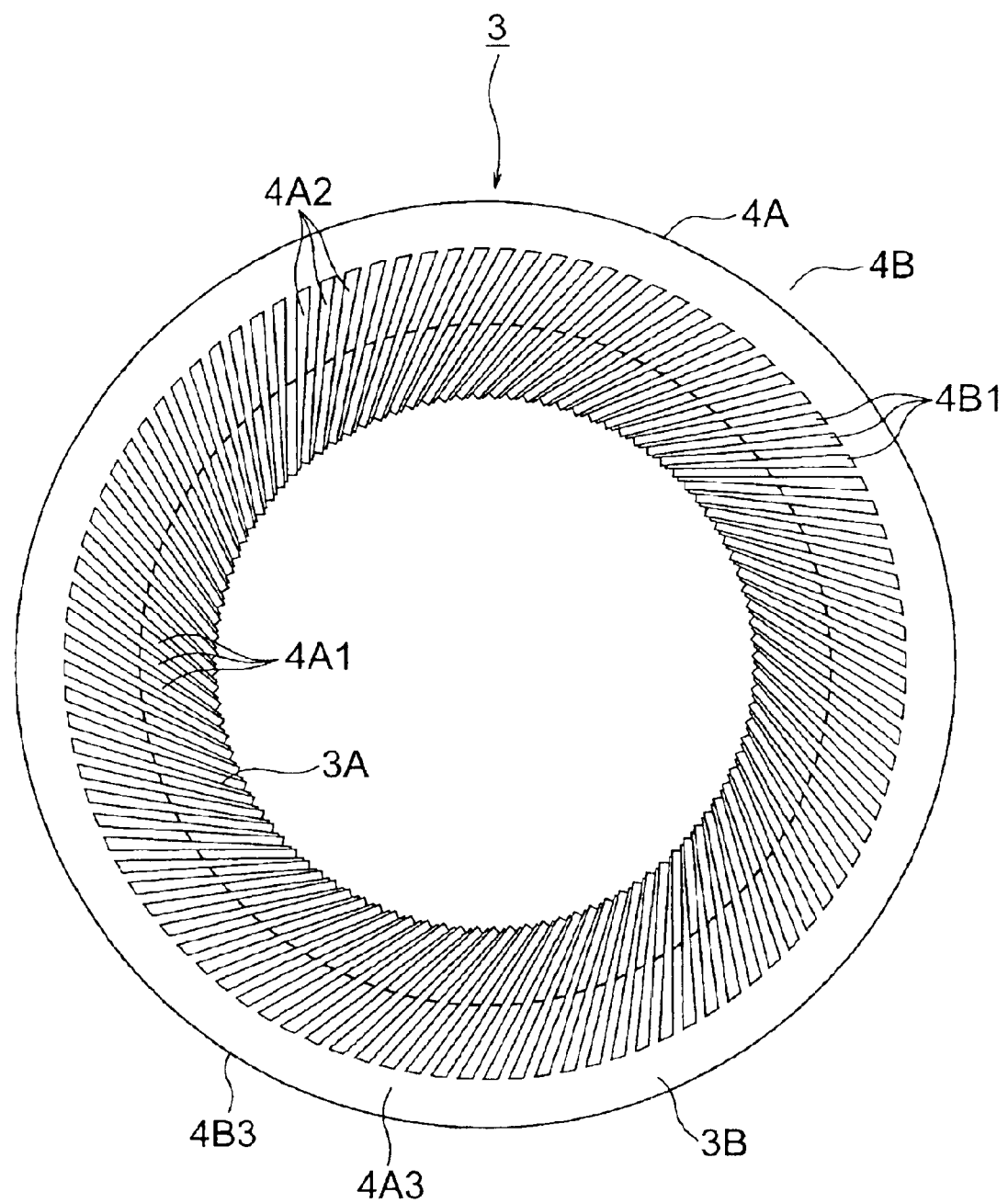
FIG. 14 is a top view of a single disk of the sheet brush seal as the sixth example of the present invention.
Figure 15:
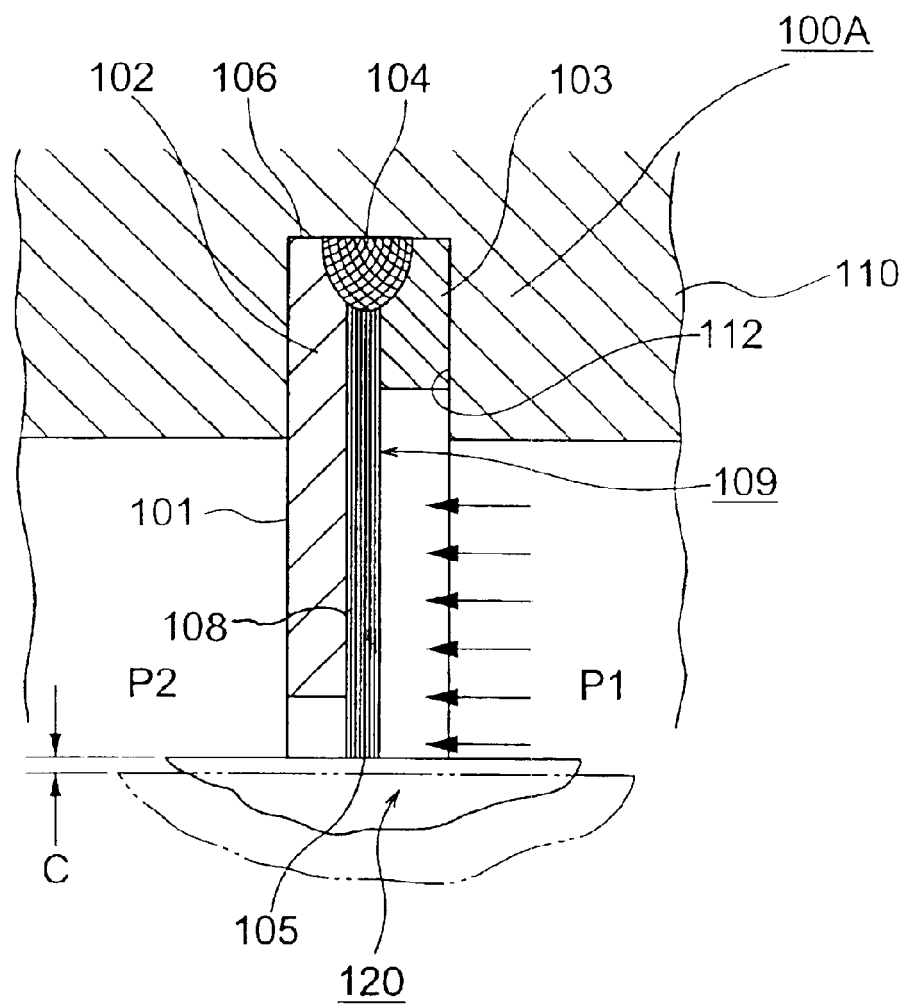
FIG. 15 is a half cut-away sectional view of a brush seal device as a relative art.
Figure 16:
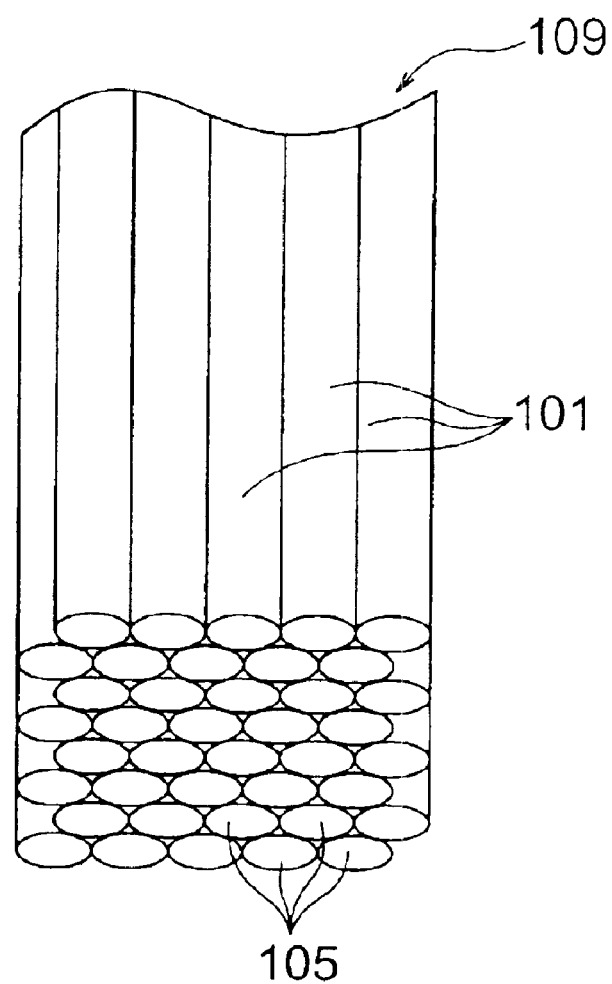
FIG. 16 is an oblique view of a portion of a brush seal as a relative art.
Figure 17:
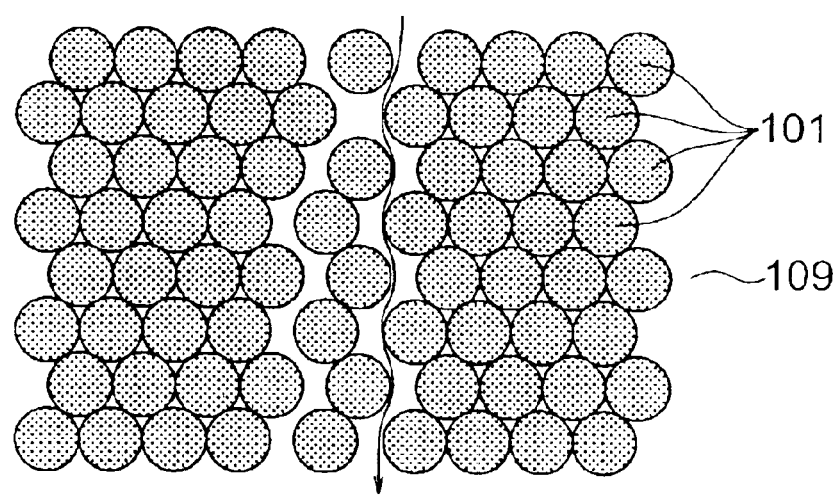
FIG. 17 is a top view of the brush seal shown in FIG. 16 viewed from the inner circumference side when a process fluid acts on the seal.

FIG. 14 represents a sixth example of the sheet brush seal disk 3. The sheet brush seal disk 3 has an integral ring structure which is comprised of a pair of the first and the second halved brush seal disks 4A, 4B both of which are of a ring form and mate with each other in an opposing manner. This sheet brush seal disk 3 is built by one piece and basically the same as a sheet brush seal disk 3 being comprised of sheet brush seal segments 4.

The sheet brush portion 3A has approximately the same form as that shown in FIG. 3. Stacking a plurality of the sheet brush seal disks 3 yields a sheet brush seal 2.

The sheet brush seal disks 3 which appear in the second example through the sixth example provide a sheet brush seal 2 by being stacked up. Assembling the sheet brush seal 2 into the casing 50 in a similar manner to FIG. 1 constitutes a sheet brush seal device 1.

The sheet brush seal 2 thus formed realizes a very narrow clearance on the first slit portion 4A2 of the sheet brush portion 3A, which significantly improves its seal performance.

When it comes to fabricating the first and the second slit portions 4A2, 4B2 in a thin sheet material, even the latest fabrication technology cannot materialize a sufficiently narrow clearance for the first and the second slit portions 4A2, 4B2 which is smaller than the sheet thickness. This difficulty causes undesirable gaps between the first and the second brush portions 4A1, 4B1, which prevents the seal performance of the sheet brush seal 2 from being improved.

However, stacking a pair of the first and the second halved brush seal disks 4A, 4B enables the sheet brush seal 2 to improve its seal performance. Also a plurality of narrow beams constituting the sheet brush portion 3A provide the brush portion 3A with a sufficient flexibility such that the contact friction with a rotary shaft 60 is reduced by the elastic deformation of the flexible beams even when the first and the second brush portions 4A1, 4B1 are pressed against the rotary shaft 60. As a result, a wear of the brush portions due to the contact with the rotary shaft 60 is effectively prevented.

The first and the second halved brush seal disks 4A, 4B are easily fabricated by means of a precision machining method such as etching process machining, wire electric discharge machining, press forming and so on.

Different embodiments related to the present invention will be described next.

In a sheet brush seal 2 related to the second invention, the thickness of the first and the second base portions 4A3, 4B3 of the first and the second halved brush seal disks 4A, 4B, respectively, is smaller than that of the first and the second brush portions 4A1, 4B1.

In this sheet brush seal 2 related to the second invention, the first and the second brush portions 4A1, 4B1 of the first and the second halved brush seal disks 4A, 4B, respectively, retain a protruding area on their side surface as a result of making the first and the second base portions 4A3, 4B3 thinner than the first and the second brush portions 4A1, 4B1. Therefore, stacking the first and the second halved brush seal disks 4A, 4B with each other to form a sheet brush seal disk 3 results in a fit-like engagement of the first and the second brush portions 4A1, 4B1 and the corresponding second and the first slit portions 4B2, 4A2, respectively. The mating engagement between the concave and convex portions not only brings a strong connection but also enhances the seal performance owing to significantly reduced clearance located between the first and the second brush portions 4A1, 4B1.

In addition, the convex portions of the first and the second brush portions 4A1, 4B1 mating with the respective concave portions of the second and the first slit portions 4B2, 4A2 provide a secure engagement. Also in the fabrication and assembly process of the first and the second brush portions 4A1, 4B1 and the corresponding second and the first slit portions 4B2, 4A2, the narrow beams of the first and the second brush portions 4A1, 4B1 can be made even narrower for increasing the flexibility of the sheet brush portion 3A. This reduces a wear of the sheet brush portion 3A under the contact with the other element (rotor) 60.

The first and the second base portions 4A3, 4B3 are fabricated thinner than the original sheet material in order that the first and the second brush portions 4A1, 4B1 protrude beyond the stacking faces of the first and the second base portions 4A3, 4B3.

The thickness is suggested to be a half of the original sheet material. However, some other choice such as one third or two thirds may be used, depending on design specifications in which the protruding height of the first and the second brush portions 4A1, 4B1 beyond the first and the second base portions 4A3, 4B3 should be optimized by adjusting the thickness of the first and the second base portions 4A3, 4B3. And an appropriate design of the engagement depth of the first and the second brush portions 4A1, 4B1 relative to the second and the first slit portions 4B2, 4A2, respectively, improves the seal performance of a sheet brush seal 2 of interest.

In a sheet brush seal 2 related to the third invention, the thickness of the first and the second base portions 4A3, 4B3 of the first and the second halved brush seal disks 4A, 4B, respectively, is a half of that of the first and the second brush portions 4A1, 4B1.

With the sheet brush seal 2 related to the third invention, in which the thickness of the first and the second base portions 4A3, 4B3 of the first and the second halved brush seal disks 4A, 4B, respectively, is a half of that of the first and the second brush portions 4A1, 4B1, the sheet brush seal disk 3 stacking a pair of the halved brush seal disks appears like a flat disk as a whole with a uniform thickness and can be used to form a ring sheet brush seal disk 3 or a square sheet brush seal disk 3, which further makes it easy to stack up the module seal disks along the axial direction or the circumference direction relative to the rotary shaft. Therefore, applicability of the sheet brush seal 2 will be expanded.

In a sheet brush seal 2 related to the fourth invention, the sheet brush seal disks 3 in a ring form are stacked in an axial direction.

A sheet brush seal 2 related to the fourth invention easily provides a seal by separating between the rotary shaft (mating element) 60 and the casing 50. Also the connection at the sheet brush portion 3A is firm and the thickness of the stacked sheet brush seal 2 can be decreased so that it can be disposed even in a small space. Furthermore, flexibility in terms of the contact with the rotary shaft 60 is enhanced and wear due to the contact can be reduced.

In a sheet brush seal 2 related to the fifth invention, the sheet brush seal disks 3 in a square form are integrally connected at the both end faces to form a ring structure as a whole.

In the sheet brush seal 2 related to the fifth invention, a plurality of the sheet brush seal disk 3 in a rectangular form connected along the circumference of the rotary shaft 60 can be used for a variety of seal devices. And the sheet brush portion 3A disposed in the sheet brush seal disk 3 can provides a soft contact to the rotary shaft 60 because of its elastic deformation. Therefore, the sheet brush seal 2 thus formed makes it possible to avoid a wear by contact with the rotary shaft 60 while allowing for being stacked along the circumference of the rotary shaft 60.

Next, merits provided by the present invention will be described in details.

The sheet brush seal disk 3 constituting the sheet brush seal 2 of the present invention is able to significantly improve the seal performance with its small clearances formed after a pair of the first and the second halved brush seal disks 4A, 4B mate with each other by engaging the first and the second brush portions 4A1, 4B1 relative to the second and the first slit portions 4B2, 4A2, respectively.

When a plurality of the sheet brush seal disks are stacked up, the mating face of the first and the second brush portions 4A1, 4B1 relative to the second and the first slit portions 4B2, 4A2, respectively, of one disk can be shifted from the similar mating faces of its adjacent disks such that the corresponding fit clearances of the adjacent disks are not aligned in the stacking direction, by which the sheet brush seal 2 further improves its seal performance.

In addition, the first and the second brush portions 4A1, 4B1 which are a collection of narrow beams retain flexibility and effectively prevent wear as a result of the reduced contact friction against its opposing element.

Furthermore, thickness of the sheet brush seal disk 3 can be made as thin as that of the cut out module disk 4C even after a pair of the first and the second halved brush seal disks 4A, 4B mate with each other. Therefore, the whole assembly remains thin, retains flexibility and effectively prevents wear due to a friction. Also the narrowed clearances of the first and the second slit portions 4A2, 4B2 of the sheet brush portion 3A improves the seal performance.

This sheet brush seal disk 3 further can be provided either in a ring form or in a rectangular form wherein a clearance is hardly present between the first and the second brush portions 4A1, 4B1 and the second and the first slit portions 4B2, 4A2, respectively. This results in an improved seal performance. This enables the sheet brush seal disk 3 to be utilized in various types of seal devices, which is expected to expand the application domains of the seal devices.

Having described specific embodiments of the invention however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sheet brush seal for providing a seal between two relatively moving parts with a presence of a clearance by being disposed in one of said parts and sealing relative to the other of said parts, said sheet brush seal comprising:

a sheet brush seal disk having a sheet brush portion wherein narrow beams are disposed in a row toward said other part as well as a stacking base portion being installed in said one part, said sheet brush seal disk comprising a pair of a first halved brush seal disk and a second halved brush seal disk wherein a first base portion of said first halved brush seal disk and a second base portion of said second halved brush seal disk are laminated with each other, said sheet brush portion being formed by engaging brush portions protruding beyond a side surface of said first halved brush seal disk and slit portions of said second halved brush seal disk as well as slit portions of said first halved brush seal disk and brush portions protruding beyond a side surface of said second halved brush seal disk, said brush portions and said slit portions of said first halved brush seal disk being located in an alternate manner, said brush portions and said slit portions of said second halved brush seal disk being located in an alternate manner.

2. A sheet brush seal as claimed in claim 1 wherein the thickness of said base portion is made smaller than the thickness of said brush portions.

3. A sheet brush seal as claimed in claim 2 wherein the thickness of said base portion of said halved brush seal disk is one half of the thickness of said brush portions.

4. A sheet brush seal as claimed in claim 3 wherein said sheet brush seal disk comprises a plurality of sheet brush seal segments which form a joined ring and are stacked up in an axial direction.

5. A sheet brush seal as claimed in claim 2 wherein said sheet seal disk comprises a plurality of sheet brush seal segments which form a joined ring and are stacked up in an axial direction.

6. A sheet brush seal as claimed in claim 1 wherein said sheet brush seal disk comprises a plurality of sheet brush seal segments which form a joined ring and are stacked up in an axial direction.

7. A sheet brush seal as claimed in claim 1 wherein said sheet brush seal disk comprises a plurality of sheet brush seal segments which have a rectangular shape and yield a ring form with the both ends of said segments being connected together.

* * * * *